July 24, 1962    E. S. TUPPER    3,046,178
FILAMENTOUS DECORATION AND FABRICATION PROCESS
Filed Feb. 1, 1957    6 Sheets-Sheet 1
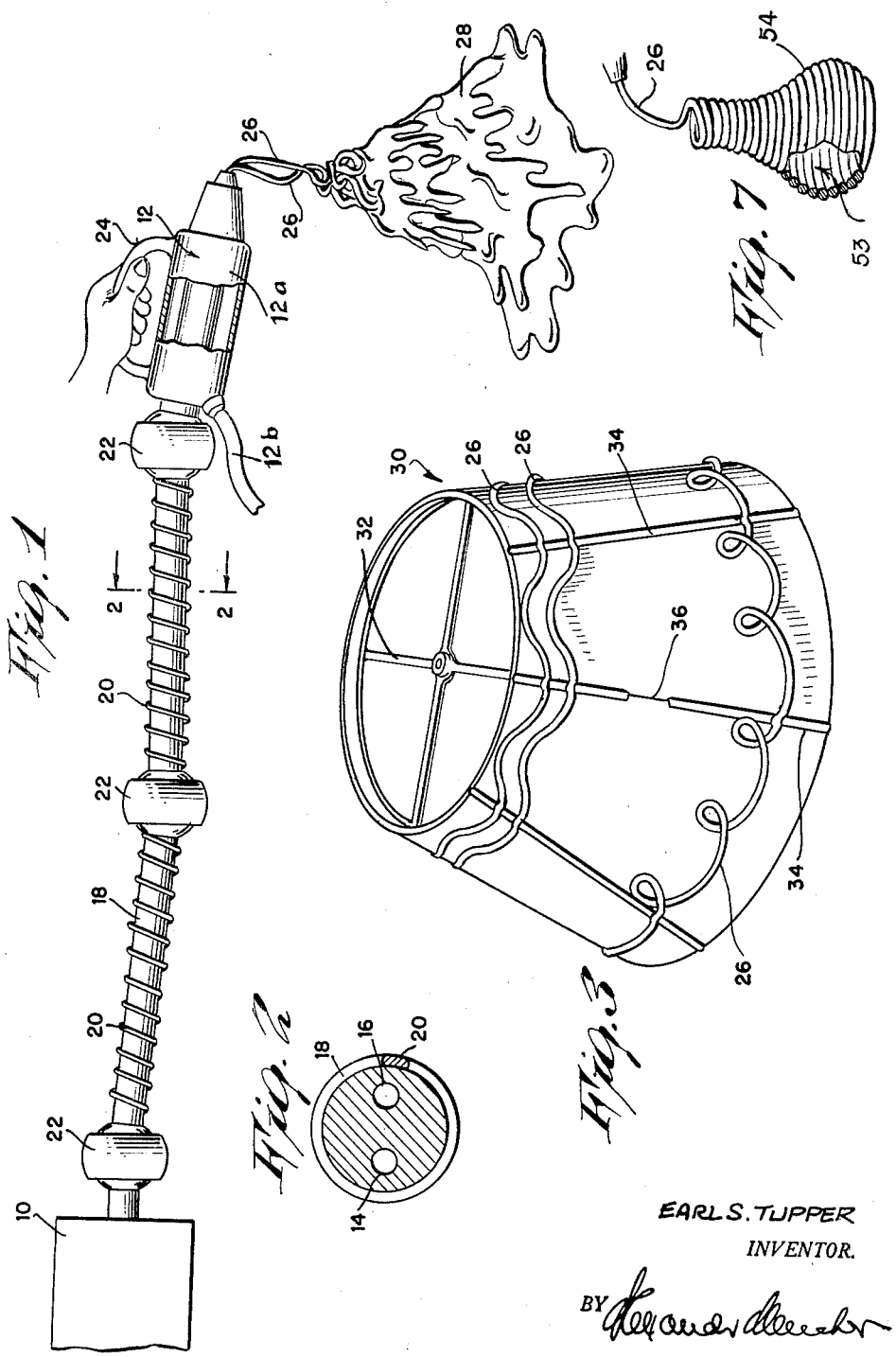
EARL S. TUPPER
INVENTOR.
BY
ATTORNEY July 24, 1962
E. S. TUPPER
3,046,178
FILAMENTOUS DECORATION AND FABRICATION PROCESS
Filed Feb. 1, 1957
6 Sheets-Sheet 2
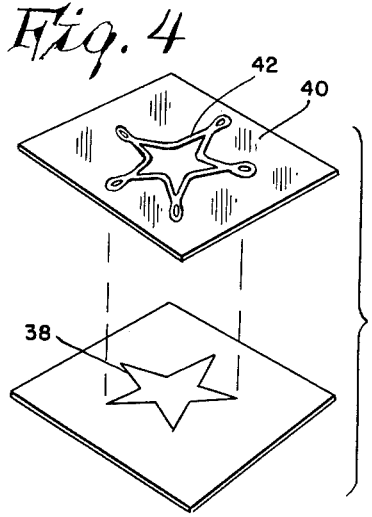
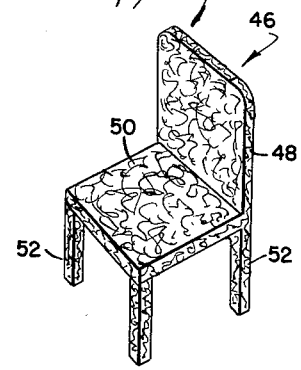
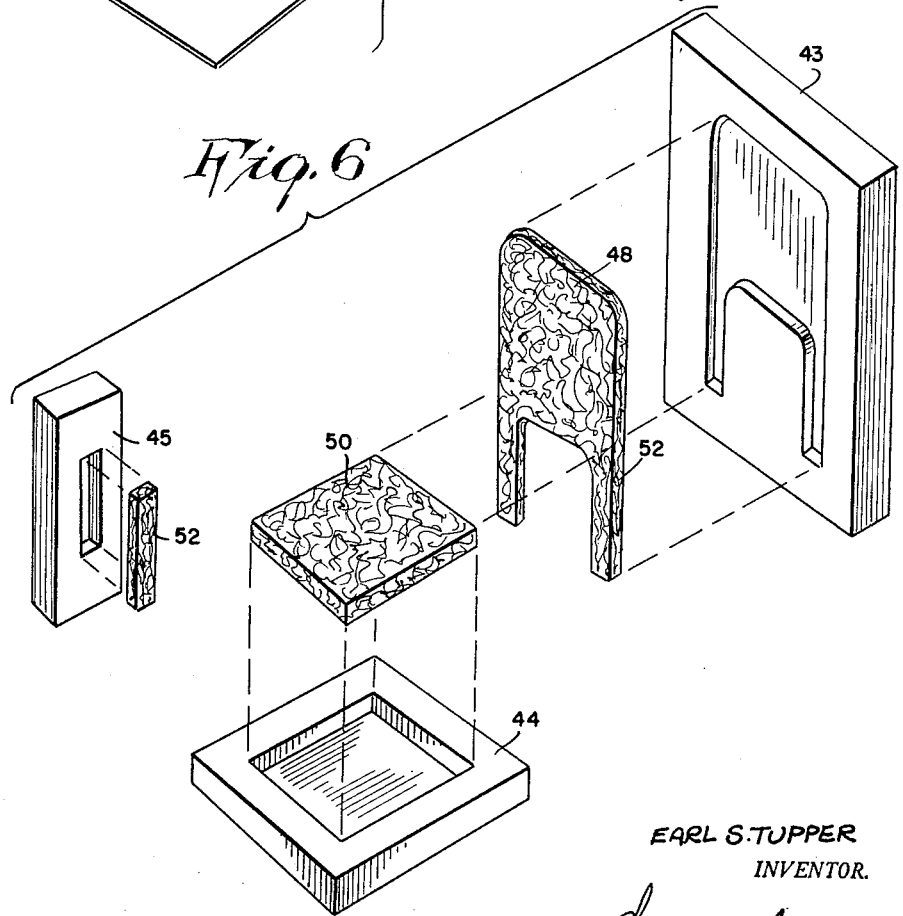
EARL S. TUPPER
INVENTOR.
BY
ATTORNEY July 24, 1962 E. S. TUPPER 3,046,178
FILAMENTOUS DECORATION AND FABRICATION PROCESS
Filed Feb. 1, 1957 6 Sheets-Sheet 3
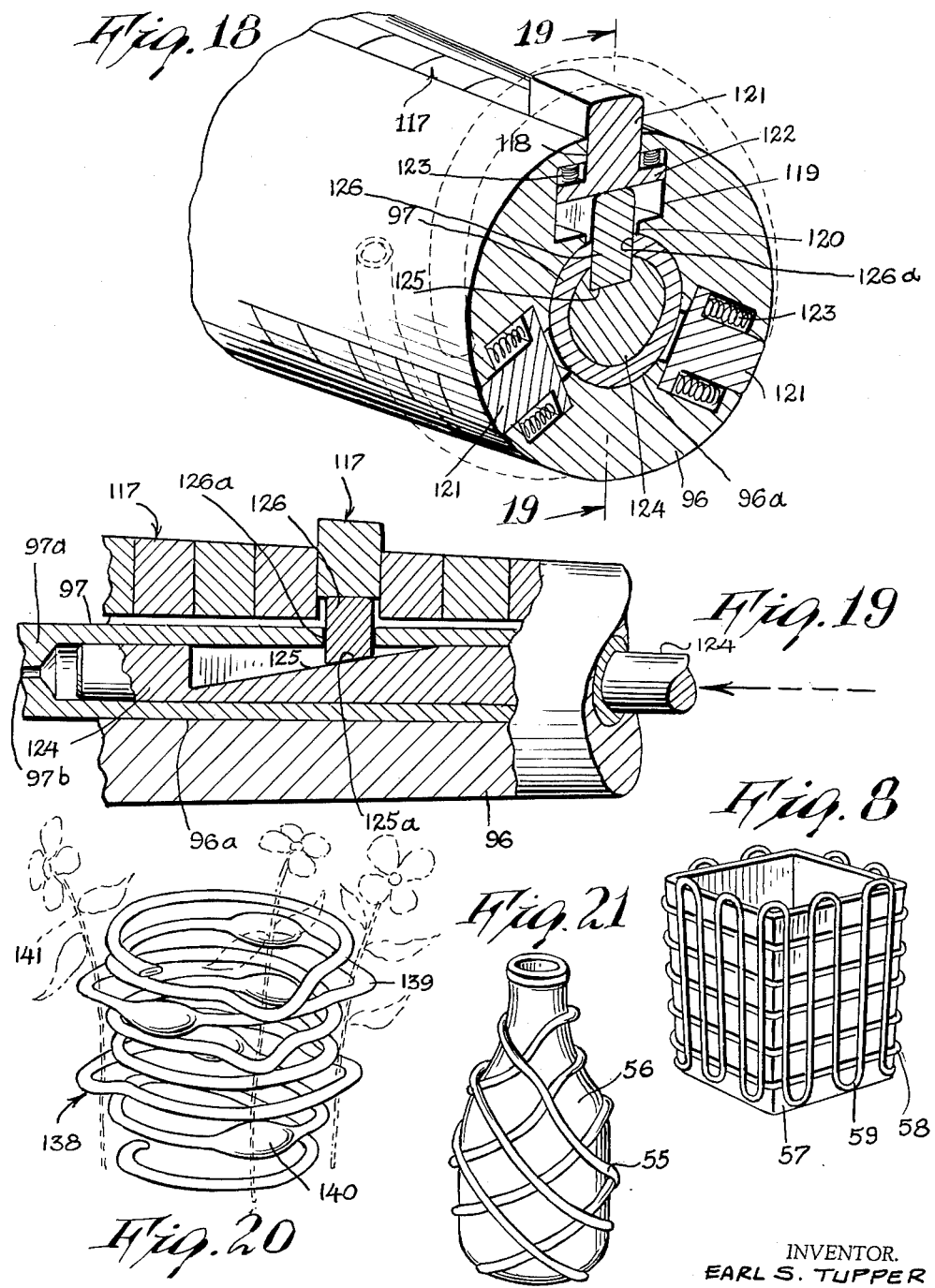
INVENTOR.
EARL S. TUPPER
BY
ATTORNEY July 24, 1962   E. S. TUPPER   3,046,178
FILAMENTOUS DECORATION AND FABRICATION PROCESS
Filed Feb. 1, 1957   6 Sheets-Sheet 4
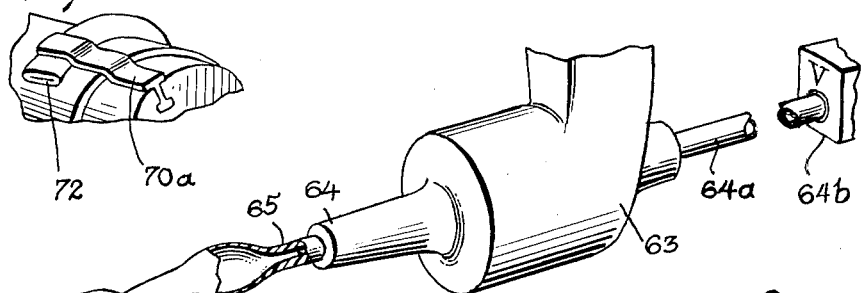
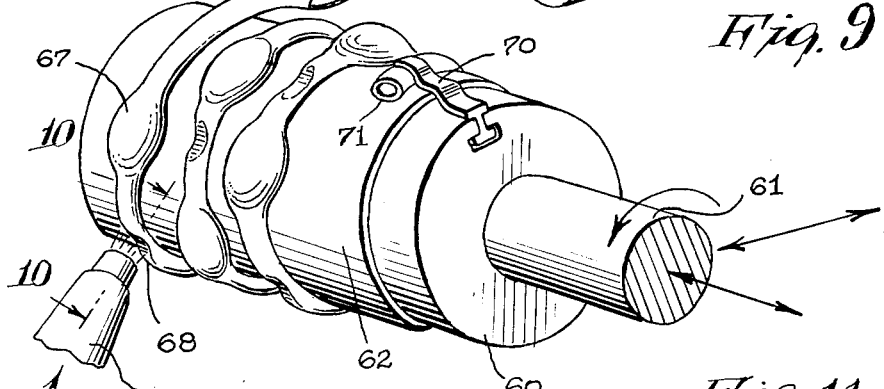
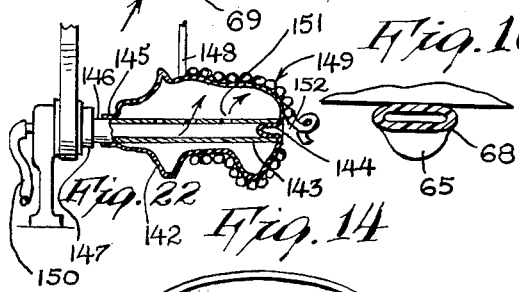
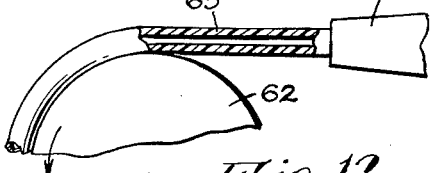
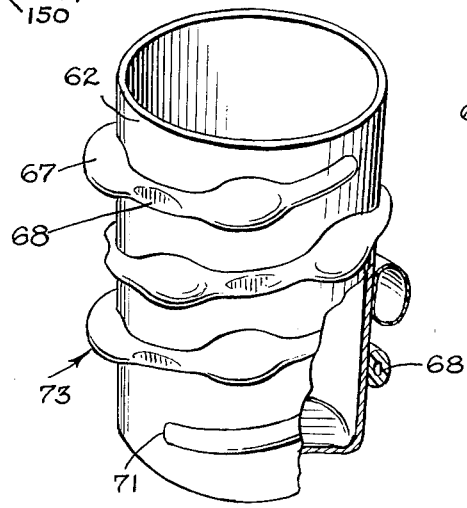
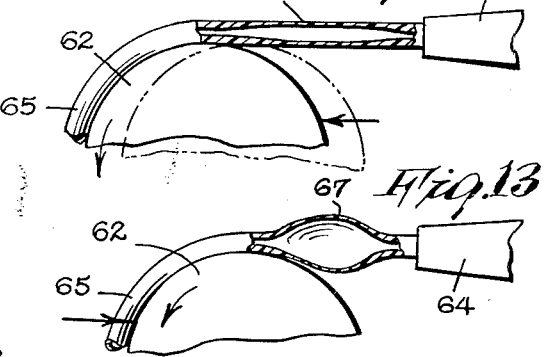
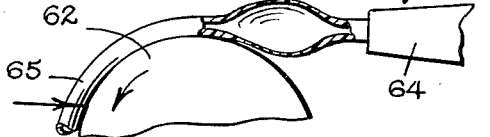
INVENTOR.
EARL S. TUPPER
BY
ATTORNEY July 24, 1962 E. S. TUPPER 3,046,178
FILAMENTOUS DECORATION AND FABRICATION PROCESS
Filed Feb. 1, 1957 6 Sheets-Sheet 5

INVENTOR.
EARL S. TUPPER
BY
ATTORNEY

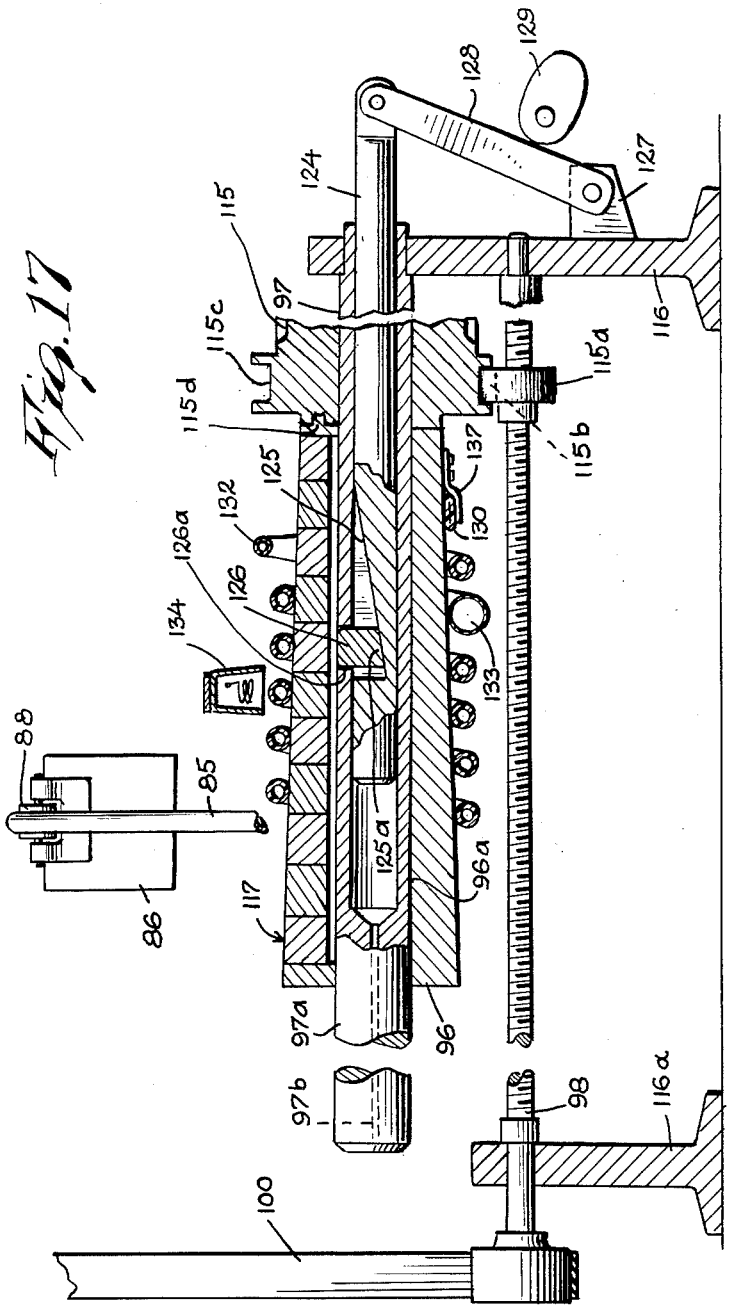

United States Patent Office 3,046,178
Patented July 24, 1962

3,046,178
FILAMENTOUS DECORATION AND
FABRICATION PROCESS
Earl S. Tupper, John Mowry Road, Smithfield, R.I.
Filed Feb. 1, 1957, Ser. No. 637,652
7 Claims. (Cl. 156—167)

This invention relates generally to the fabrication and decoration of articles of manufacture, but more particularly to means, methods and products involving freshly extruded resinous filaments of all cross-sectional sizes and shapes, both hollow and solid.

It is one of the primary objects of the present invention to provide new methods of forming plastic articles of manufacture directly from the extrusion head.

It is another important object of the present invention to provide new methods of decorating articles of manufacture directly from the extrusion head.

It is still another object of the present invention to produce plastic articles having unusual decorative effects directly from the extrusion head.

It is a further object of the present invention to provide several forms of apparatus for utilizing extruded resinous filaments directly from the extrusion head for fabrication of plastic articles, for decoration of articles of manufacture, and for joining parts in processing of plastic articles of manufacture.

Briefly stated, the method of the invention involves directing the issuing stream of resinous material from an extrusion head for deposition toward formation of preselected designs either for fabrication of articles of manufacture, for decoration of articles of manufacture and for processing during manufacture.

A method of the invention further comprises receiving continuous extruded tubing or piping on an object mounted on movable apparatus or on said apparatus itself for effecting decorative effects on the object or for fabrication of a hollow product respectively.

A further object of the invention resides in a method of fabricating plastic products or decorating objects from an extruding head either by manipulation of the extruded filamentous or tubular stream or movement of a body receiving such extruded plastic.

Another object of the invention resides in a method of artistically decorating objects of plastic or non-plastic materials by formulation of extruded filaments and tubes issuing from an extruder.

A further object of the invention resides in extreme economy of plastic fabrication and decoration, capacity for effectuating novel, personal, artistic, strong and durable plastic fabrication and decoration.

These objects and other ends and advantages of the invention will hereinafter appear in the progress of the disclosure and as pointed out in the appended claims.

Accompanying this specification are drawings showing several illustrative embodiments of the invention wherein:

FIGURE 1 is a side view in elevation of one form of hand manipulable apparatus for carrying out one aspect of the present invention;

FIGURE 2 is a sectional view taken on line 2—2 of FIGURE 1 in the direction of the arrows;

FIGURE 3 is a perspective view of a lamp shade seamed and decorated in accordance with the apparatus of the present invention;

FIGURE 4 shows the manner in which a design may be produced from a pattern utilizing the apparatus of the present invention;

FIGURE 5 shows a chair formed by utilizing the apparatus of the present invention;

FIGURE 6 is an exploded view showing a multi-step molding operation by which the chair of FIGURE 5 may be formed;

FIGURE 7 is a view in perspective showing one form of fabrication of a hollow article such as a vase formed by apparatus of FIGURE 1 of the present invention;

FIGURE 8 is a decorative effect on a vase capable of formation by utilizing the apparatus of FIGURE 1 of the present invention;

FIGURE 9 is a diagrammatic view in perspective showing one form of apparatus for extruding tubing, formulating said tubing in preselected design, simultaneously expanding and cooling said tubing at preselected intervals.

FIGURE 10 is a sectional view of FIGURE 9 across the plane 10—10 thereof;

FIGURE 11 is a fragmentary diagrammatic view of use of apparatus of FIGURE 9 showing the first step of simultaneous cooling and expanding; FIGURE 12 shows the stretch of the second step and FIGURE 13 shows the bulbous formation of the third step;

FIGURE 14 is a view in perspective showing a decorated product pursuant to apparatus of FIGURE 9;

FIGURE 15 is a fragmentary view in perspective showing a flattened initial end of the extruded tube in contrast to the open ended tube of FIGURE 9;

FIGURE 17 is a sectional view of FIGURE 16 across the plane 17—17 thereof;

FIGURE 18 is a view in perspective of a section of the mandrel shown in FIGURE 17;

FIGURE 19 is a sectional view of FIGURE 18 across the plane 19—19 thereof;

FIGURE 20 is a perspective view showing a completely fabricated article pursuant to FIGURE 16;

FIGURE 21 is a view in perspective showing decorative effect on a jug pursuant to the apparatus of FIGURE 1 of the invention;

FIGURE 22 is a diagrammatic view partly in section showing another form of apparatus to receive extrusions both hollow and solid on an inflatable mandrel of any preselected design for design formulation of an extrusion.

Figures 16, 16A:
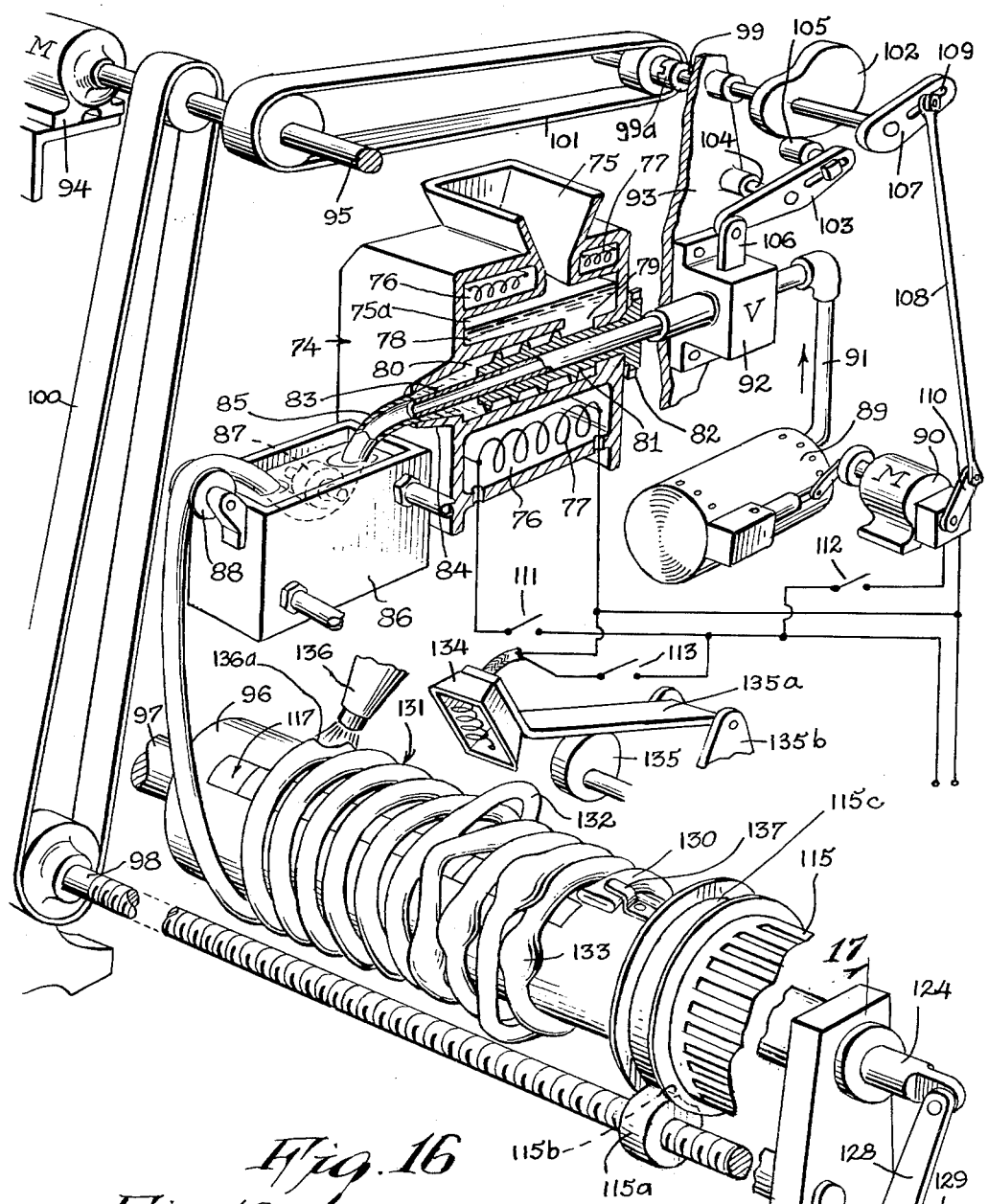
FIGURE 16 is another diagrammatic view of another form of apparatus for extruding tubing modified over FIGURE 9.
FIGURE 16a is a fragmentary side view of the driving mechanism shown in FIGURE 16.

As has been stated heretofore, the method of the present invention essentially consists in formulating an extrusion in any form such as a continuously formed filament or tubing while in workable plastic condition toward fabricating an object, decorating an object or toward a combination of fabrication and decoration.

In FIGURE 1, one form of apparatus for carrying out the process is shown. As may be seen in the drawings, an extrusion from extruding barrel 10 is conducted to an applicator gun 12 through a pair of conduits 14 and 16. The extrusion of FIGURE 1 is shown as a filament, but it is understood that such extrusion may also be in the form of tubing or piping. These said conduits 14 and 16 are housed within a support member 18 having universal joints 22 to permit the gun 12 to be freely manipulated. Properly insulated heating coils 20 (insulation not being shown) are wound around elongated support member 18 to provide the heat necessary to prevent the solidification of the extruded filament or extruded tubing in the conduits and to prevent burns of the operator. The applicator gun is provided with a handle 24 so as to be readily gripped and manipulated by hand. Applicator gun 12 is provided with a conventional water cooling jacket 12a with a continuous water stream passing in and out, the inlet being indicated by numeral 12b. Although not shown, support member 18 may be resiliently supported by a spring to alleviate the load thereof while gun 12 is being used.

The resins which may be utilized to form the filament or tubing include both thermosetting and thermoplastic varieties, the only qualification governing the selection of the resin is that the resin utilized must be extrudable in the form of a workable plastic filament such as 26 or a workable plastic tubing. The diameter of the solid mono-filament or hollow filament (tubing) is not restrictive, but for the functions hereinafter described, the filament may be in the neighborhood of ¼ inch. It is understood that the word "filament," in the specification and claims, is not restrictive as to size and shape and includes tubing. It is furthermore to be emphasized that the extrusion used in the instant invention includes the free deposition thereof while in workable plastic condition for purposes of fabrication, decoration and processing.

The invention may be practiced with a single extrusion or with a plurality of extrusions such as the two shown in FIGURE 1 of the drawing. Additionally, if two or more extrusions are utilized simultaneously, they may be of different colors. Of course, the nozzle orifices of gun 12 may be of smaller diameters than conduits 14 and 16 shown and with which they are in communication.

In operation, conduits 14 and 16 may be maintained at a temperature range of from 350 to 600 degrees Fahrenheit or variations thereof depending on the specific resin used in order to maintain a rapid flow of material from extrusion barrel 10 to applicator gun 12. The cooling jacket is utilized to prevent danger of burns by the operator and reduces the filament temperature somewhat. Other insulating means instead of a water jacket may be used. In FIGURE 1, filament 26 is shown flowing without guidance from both barrels of the applicator gun and solidifying beneath the gun in a stalagmite formation 28. It is to be noted that very unusual abstract and aesthetic efforts may be obtained with the apparatus shown in FIGURE 1, the invention encompassing within its scope a new resin art form to be practiced with the filamentous or tubular formulation of the present invention.

In FIGURE 3, a lampshade 30 is shown which illustrates two important adaptations of the present invention. As may be seen from the drawing, the shade has been decorated with filament 26, the decoration at the top portion of the shade being carried out with both barrels of applicator gun 12 while the looped decoration at the lower portion of the shade has been accomplished by a single barrel. It may be therefore seen that plastic articles of any type may be decorated by applying the filament while hot directly to the article to be decorated.

In the manufacture of plastic lamp shades such as shown in FIGURE 3, shade 30 may be initially formed in sheet form and thereafter wound around a frame such as 32 which gives the shade its conical form. Of course, after being wound around frame 32, the ends of the shade must be secured to one another in order to preserve its conical shape. It has been found that the ends of the shade may be seamed together by utilizing filament 26 to seal the free ends of the shade together, the juncture 36 appearing thereafter as one of a plurality of decorative ribs 34 rather than a seam. It may be thus seen that the filament of the present invention may be utilized not only for decorative purposes but also as an integrating weld for securing articles of plastic composition to one another.

In FIGURE 4, there is shown a method of reproducing designs in accordance with the present invention. A pattern 38 is first aligned with a sheet of transparent material 40. By utilizing the filament of the present invention, the pattern may be traced on the sheet. Once the filament solidifies or sets on the sheet, it may be removed therefrom to yield a three dimensional plastic design 42. This is but one of the many plastic art forms that are opened up by the present invention. Needless to say, the flexibility of the jointed support members 18 through the universal joints 22 makes all sorts of free hand work possible.

In FIGURES 5 and 6, there is shown a method of fabricating an article of manufacture such as a plastic chair 46 in accordance with the present invention. Various molds, 43, 44 and 45 are provided for the formation of the different elements making up the chair such as the backrest 48, seat 50 and legs 52 respectively. In fabricating articles in accordance with the present invention, filament 26 is simply fed into the mold wherein it sets and solidifies. Once the various elements are formed in this fashion, they are removed from their respective molds and are welded together into a unitary article by means of the filament as aforesaid.

FIGURE 7 shows the fabrication of a vase 53 by convolutions 54 formed by manipulating gun 12 and utilizing a single stream 26.

The invention contemplates also the form of apparatus used in the method thus far described, namely extrusion head 10 in combination with the heatable flexible conduit 18 and the applicator 12 flexibly connected with conduit 18.

The temperature drops from extruder barrel 10 through the conduits 14 and 16 and through gun 12 are controllable as mentioned for proper flow of filament 26. Cut-off means from extruder barrel 10 are conventional although not shown. In connection with removal of solidified plastic in the conduits 14 and 16 and in gun 12, heating coils 20 may be suitably energized and any suitable heating means applied to gun 12 so that by gravity flow the conduits are clearable. Moreover, the speed of flow of filament 26 through gun 12 is also controllable by temperature variations and by rate of extrusion from barrel head 10.

In FIGURES 8 and 21 are shown types of decorative effects such as interlacing 55 on a vase 56 and combined horizontal and vertical decorative effects 58 and 59 on a waste basket 57. Of course, where vase 56 and basket 57 are formed of thermoplastic material, adhesion with the plastic extrusions is effected by fusion at contacting areas. Otherwise, the design formation itself, capillarity, or separate adhesive materials serves as a gripping or securing means.

It is understood that gun 12 may be supported and locked in any adjusted position about one or more of the joints 22 for fixed direction of extrusion 26 on a fixed or movable body for deposition thereon.

One form of illustrative and novel equipment is shown in FIGURES 9–13 and another form in FIGURES 16–19 for commercially formulating hollow filaments or tubular extrusions issuing from an extrusion head for modified types of fabrication and decoration embodying artistic, bizarret, distinctive and useful structures and effects.

Working with a continuously extruded tube or hollow filament from an extrusion head, it has been found that preselected or continuous sections thereof during feeding or formulation on a rotating, linearly and/or angularly movable mandrel or object mounted on such mandrel are capable of being modified for artistic or functional effect. By controlling the flow and/or pressure of air, gas or a fluid feeding through the extruder head or nozzle and through the hollow extruded section, such section is prevented from collapsing due to fusion heat and cooling simultaneously takes place. At the same time areas of such a section may be expanded by stretching the still warm and soft extrusion as it is applied to the mandrel surface or to the surface of the object mounted on the mandrel to effectuate a reduction in wall thickness for bulbous expansion threat by the air or fluid pressure. This is shown particularly in FIGURES 9–13.

On the other hand, when the extrusion passes through a pre-cooling bath before feeding on the rotating and linearly or otherwise movable mandrel or object mounted thereon, separate heating means are used for expansion and auxiliary cooling means may also be used, as shown in FIGURES 16–19.

FIGURES 9–13 illustrate diagrammatically one form of apparatus and a method for fabricating and decorating objects with extruded tubular filaments utilizing variable and/or fixed fluid pressure including air or gas or fluids such as water for maintaining shape of the hot and soft extrusion, simultaneously cooling and optionally decoratively expanding portions of the extrusion. Thus, extrusion barrel 63 is provided with a nozzle or die 64 having an internal tubular member 64a for channelling fluid flow and shaping the hollow extruded filament 65. Flow pressure is controlled by valve 64b. Fluid flow pressure also controlled by the operator maintains extrusion 65 in proper hollow form and prevents the same from collapsing. Nozzle 64 is properly mounted for positioning so that extrusion 65 may be taken up by a rotating and axially movable mandrel operative surface also reciprocable if desired whereby various configurations of continuous runs of extruded plastic hollow filaments are capable of accomplishment by movement of the mandrel and functioning of the fluid flow through the extrusion.

As best illustrated in FIGURE 9, a mandrel 60 of any desired shape is provided with an axis 61 secured thereto, said axis being provided with conventional means (not shown) for rotation thereof as indicated by the curved arrow, and also with conventional means (not shown) for axial and other movements as indicated by the arrows. FIGURE 9 shows as the operative surface of mandrel 60 a sleeve 62 mounted on the mandrel for purposes of sleeve decoration. It is of course not essential to have the extruded filament 65 worked on a mandrel mounting such as sleeve 62; a formation may be formed directly on the mandrel surface for slidable removal therefrom when it is desired to fabricate a hollow form.

Thus as the heated and soft extrusion 65 prevented from collapsing by the pressure of fluid flow therein leaves nozzle 64, it is taken up at the initial end of the rotating and axially moving operative surface of mandrel 60 such as sleeve 62 and there secured against movement by suitable means such as clamp 70. During rotation of the mandrel through axis 61 in a counterclockwise direction and during synchronized axial and linear inner movement, a helical formation is formed on sleeve 62.

FIGURES 11–13 illustrate how a modification of the extrusion diameter may be effected during the rotary and axial movements of mandrel 60; and as best shown in FIGURE 12, a forward horizontal displacement of the mandrel will cause a stretching of a portion of the extrusion 65 as indicated by numeral 66 thereby thinning the walls. Simultaneously with such stretching, the fluid pressure from tube 64a controlled by valve 64b will cause an expansion of the thinned wall section such as a bulbous segment 67. Timed therewith the mandrel may be reciprocated back to its original position as indicated in FIGURE 13 by the arrow. The same fixed or additional pressure may be used at the interval of such expansion through manual or automatic control of valve 64b.

In this way and by the apparatus illustrated it is seen that the fluid flow may have a triple function; maintenance of extrusion shape against collapse, gradual cooling of the extruded configuration (the fluid flow escaping through open initial end 71 as seen in FIGURE 9) and blowing up or increasing the diameter of preselected parts of the extrusion as at 67. Thus a configuration of varying design motifs may be made by selective motions of mandrel 60 and by selective fluid pressures utilized. Of course the initial end 71 may be closed or partially closed as at 72 and be maintained in relative fixed position with respect to mandrel 60 by clamp 70a as shown in FIGURE 15. In such event there is a failure or partial failure of fluid escape causing a back pressure therby necessitating a change in pressure by automatic or manual control of valve 64b for purposes of gradual cooling and expansion of the extrusion as heretofore mentioned.

For creation of substitute or additional design variations, an external fluid gun such as of compressed air or carbon-dioxide as 69 may be applied against the extruded configuration on mandrel 60 to rapidly cool and/or simultaneously flatten a portion 68 as shown in FIGURE 9. Utilizing the gun 69, it is possible to close off any of the sections of the already formulated extrusion product, the rapid cooling and flattening of section 68 creating a hardened and oriented section. Gun 69 may also be used locally or generally as an external cooling device to augment the cooling action of the internal fluid flow through extrusion 65 and to create other desired effects.

After withdrawal of sleeve 62 from mandrel 60 (or after sliding removal of the extruded configuration on the mandrel surface when no surface to be decorated is mounted thereon), a design effect 73 is formed as seen in FIGURE 14. The design further serves to reinforce the side walls of sleeve 62 which may represent any hollow article of manufacture.

In FIGURE 16 is illustrated diagrammatically another apparatus and a modified method for effecting the objects of the invention herein. Conventional extrusion equipment is shown for extruding a tubular filament as by any known apparatus as generally indicated by numeral 74. Thus, a hopper 75 leads into a screw chamber 80 containing screw 81 and driven by a drive 82. Chamber 80 as shown is surrounded by a heating barrel 76 having heating elements 77, the plastic 78 being plasticated as at 75a by heating barrel 76 and the working of screw 81 receiving plastic 78 through opening 79 of chamber 75a. Screw 81 is provided with a concentric flow pressure tube terminating concentrically of die or nozzle 84 whereby tubular extrusion issues therefrom as indicated by numeral 85.

The shape of extruded tube 85 is prevented from collapsing by flow of air, gas or liquid through tube 83 as described in conjunction with the apparatus of FIGURE 9 and as will hereinafter be discussed.

A water bath 86 is provided in the apparatus of FIGURE 16 and the slow cooling function of the fluid pressure is not as important as in the prior described apparatus. Bath 86 has a roller 87 under which extrusion 85 proceeds, the extrusion then passing over roller 88 for takeup by a rotating and axially movable mandrel hereinafter to be described. For purposes of introducing flow pressure, a compressor or pump 89 and tube 91 is represented in FIGURE 16, the tube carrying the pressurized flow into a valve chamber 92 which is in communication with tube 83. As shown, valve chamber 92 is suitably secured to a mounting plate 93. Adapted to operate the valve 92 and for synchronizing such operation with the motion of the mandrel for take-up of the extruded tube or filament 85 after leaving the water bath 86 is a prime mover such as a two-way motor 94 rotating a drive shaft 95.

Drive shaft 95 serves to cause synchronized rotary and axial movement of a mandrel 96 about a hollow bearing sleeve 97 for a helical formulation of the extruded tube 85 thereabout, the movement being effected by the driven screw 98. Shaft 95 also drives shaft 99, the transfer of motion to screw 98 and shaft 99 being effected by conventional means such as belts 100 and 101. Mounted on the driven shaft 99 is a valve control cam 102 adapted to operate valve 92 through a control arm 103 centrally pivoted on a bearing 104 mounted on plate 93. At the outer end of control arm 103 is a cam follower 105 engaging cam 102 and at the inner end is a valve arm 106 pivoted thereto. Thus, automatic and adjustable synchronization may take place between movement of mandrel 96 and the timing and extent of fluid pressure passing through tube 83 for introducing variable or fixed pressures in the extruded tube 85 for desired purposes as hereinafter will be set forth.

To the forward end of driven shaft 99 is secured a lever arm 107 which actuates a vertically extending link 108 movably secured in arm 107 in slot 109, the lower end of link 108 being secured to a link 110 for driving motor 90. In this way, the development of variable fluid pressure, the control of valve 92 and motion of mandrel 96 are all synchronized for desired operation. Of course, a minimal fluid pressure passes through valve 92 at all times to prevent collapse of the hot and soft extruded tube issuing from nozzle 84.

There are independent controls for the heating means 77 in the extrusion apparatus such as switch 111, while a switch 112 when closed may actuate the motor 90 without regard to operation of the prime moving motor 94 for developing variable or fixed fluid pressure regardless of the position of mandrel 96. In such event, a clutch 99a may be introduced in connection with shaft 99 whereby electrical operation as distinguished from mechanical operation of motor 90 through prime mover 94 may take place. A switch 113 is also presented for purposes of introducing external heating means to specific portions of the convolutions of the extruded tube 85 on mandrel 96 for stretch and expansion of areas thereof as will hereinafter appear.

The driven screw 98 has suitable and conventional means for effecting rotary and linear movements of mandrel 96 and dwells therfor for automatic processing of design variations on the extrusion take-up by mandrel 96, the mandrel movements taking place between inner surface 96a and the bearing surface of sleeve 97. Thus and as shown in FIGURES 16 and 16a screw 98 has a spur gear 114 which is in rotary and slidable engagement with an elongated spur gear 115 secured to one end of mandrel 96, the screw being journalled in standards 116 and 116a as seen in FIGURE 17. Gear 114 has a dwell portion 114a for purposes to be described. Conventional means are provided to impart linear movement to mandrel 96. Thus, screw 98 has a threadedly engageable round type of nut 115a having a shoe face 115b bearing against the circular raceway 115c secured to one end of elongated gear 115 to prevent nut rotation (FIGURES 16 and 16a).

Mandrel 96 as shown is conically tapered and is provided with stretching means interior of or formed therewith as distinguished from mandrel 60 which requires displacement for such purpose. Thus intermediate the ends of mandrel 98 and extending axially along the surface thereof are spaced rows of adjacent stretching blocks, each of the blocks of each row being indicated generally by numeral 117.

As best shown in FIGURE 18 each of the blocks 117 in any of the rows is radially reciprocable in longitudinal slots intermediate the mandrel ends, each slot serving to receive each of the row of blocks. Each longitudinal slot proceeds inwardly from the mandrel surface, portion 118 developing into a rectangularly shaped and enlarged portion 119 to form an inverted T-formation with portion 118, the bottom wall of said rectangular slot portion 119 having an intermediate slot portion 120 which penetrates the inner wall 96a of mandrel 96. Each block 117 is formed of an inverted T-shaped figure having a vertical arm 121 movable in slot portion 118 and the cross arm 122 movable along the side walls of slot portion 119. Coil springs 123 are suitably mounted between the upper wall of slot portion 119 and the opposing face of block cross arm 122 to normally maintain each of the blocks 117 in continuous surface relationship with the surface of mandrel 96.

In order to effectuate periodic and outward radial movement of any of the blocks 117 is a cam arm 124 having an inclined cam surface 125 which is operable on a cam follower block 126 penetrating an opening 126a in the fixed bearing sleeve 97 and along the top thereof. Cam surface 125 cooperates with the inclined bottom portion 125a of cam follower block 126. Cam arm 124 is axially movable within the interior of sleeve 97, said sleeve 97 at one end being solid as indicated at 97a, the solid portion being provided with a reduced axial orifice 97b to prevent pressure build-up by movements of cam arm 124. As shown in FIGURE 17, sleeve 97 is suitably mounted on standard 116 while cam arm 124 is also connected to 116 by means of bracket 127, a pivoted lever 128 being secured between bracket 127 and the end of cam arm 124.

As has been mentioned previously, the purpose of any of the block 117, which are radially and outwardly movable with respect to mandrel 96, is to set forth modified structure and function from the embodiment of the invention of FIGURES 9–13 for causing an elongation of the tubular extrusion 85 take-up on mandrel 96 at preselected or desired intervals. Elongation of tube formation 85 is effected only when a position of mandrel 96 is reached when it has a line of blocks 117 in upper vertical position at which time one of the blocks in said line is in alignment with aperture 126a on the non-rotary sleeve 97. At this time, cam follower block 126 is in inoperative position below or coplanar with the surface of sleeve 97 and is caused to penetrate opening 126a as shown in FIGURES 18 and 19 by preselected amount of inward movement of cam arm 124 for thrusting up the overlying block 117 against the action of the springs 123 for projection above the mandrel surface, the degree of consequent block projection 117 depending upon the extent of the inward motion of cam arm 124. The penetration and period of penetration of block 126 in opening 126a is controlled by the dwell 114a of gear 114. At such time, mandrel 96 is free of rotation and linear movement. Reciprocable movement of cam arm 124 synchronizes with the dwell period. Outward movement of cam arm 124 brings about the lowering of follower block 126 and consequent spring return of block 117 to its normal position thereof (FIGURE 17). For this purpose, a preselected cam-shaped member 129 may be provided to intermittently and controllably actuate reciprocal movement of cam arm 124 in preselected synchronization with the dwell period.

In operation and as indicated in FIGURES 16 and 16a, mandrel 96 at the initial end is opposite and below roller 18 where the extrusion end turn 130 commences. This end turn is preferably clipped into position as indicated by a clip 137 secured to mandrel 96 to prevent relative movement and as shown is partly flattened but it may also be fully open to serve as an exit for the fluid of tube 83. The mandrel rotates in a clockwise direction and also travels linearly by the coaction of gears 114 and 115 and the coaction of circular nut 115a and raceway 115c. The extrusion conformation on mandrel 96 during formation is indicated generally by numeral 131 while stretched portions are indicated by numeral 132. As has been described, such stretched portions are brought about by operation of the cam block 126 acting upon an overlying block 117 of one of the spaced rows of blocks shown in FIGURE 18 during the dwell of mandrel 96.

The conformation 131 is also shown to have expanded portions such as 133. But since the stretched portions 132 and the expanded portions 133 are formed from the extrusion preliminarily cooled by the water bath 86 and partly by the shape sustaining fluid flow in tube 83, external heating means are required in contrast to the hot and still plastic condition of the extrusion at the time of take-up and while on mandrel 60 as described in connection with FIGURES 9–13. For this purpose a pivoted and arcuately movable heating element 134 is provided and the same may be used intermittently as by the use of a cam 135 engaging the heater arm 135a pivoted to a standard 135b. The heater 134 may be independently used as by the operation of the heretofore mentioned switch 113. Thus, by the application of movable heater 134 to a stretch of the conformation 131, the same is heated to softness to permit the stretching of portions 132 by any of the blocks 117, the fluid pressure from tube 83 preventing the collapse of the walls. All or preselected stretched portions 132 may be blown to bulbous formation as at 133 by control of the fluid pressure flowing therethrough, those stretched portions 132 not intended for expansion being externally and rapidly cooled as by a pressure gun of gas air, carbon dioxide or the like as indicated by numeral 136a of FIGURE 16 operating for similar purposes as gun 69 in the form of the invention shown in FIGURES 9–13.

The pressure from gun 136 may also serve to flatten out portions as at 136a. The fluid pressure whether it be gas or liquid may either run out of the initial extrusion end 130 if slightly open, but if closed at such end or intermediately, the back pressure developed may serve to vary the amount of pressure required for subsequent turns.

In the embodiments shown in FIGURES 9–13 and FIGURES 16–19, guns or other external means may also be used for auxiliary cooling of the extrusions 65 and 131 respectively as well as for the purposes mentioned.

In FIGURE 20 is shown a conformation in the form of an article of manufacture indicated by numeral 138 which has been formed on the mandrel 96, the said configuration showing stretched portions 139 for creating a design variation and bulbous portions 140 for the same purpose. The fabricated product indicated by numeral 138 may be used for many purposes, but as shown is used as a vase for flowers indicated by numeral 141. Article 138 may be removed from mandrel 96 in any conventional manner. As shown and because of the taper direction of the mandrel, the latter is disconnectable from gear 115 as by a clutch arrangement indicated generally by numeral 115d whereupon the extruded configuration may be slid off. On the other hand, where the mandrel is of a shape to permit sliding removal of the extruded formation thereon, the extrusion is pulled off at the mandrel free end adjacent sleeve 97b (FIGURE 17). Of course, even after a formulation of a hollow extrusion such as 138 is removed from a mandrel, it may still be worked both by hand and automatically by applying fluid pressure therethrough and by heating, stretching or blowing preselected portions as heretofore mentioned for shape and dimensional variation.

In FIGURE 22 is shown another illustrational form of apparatus for deposition of a free extrusion thereon utilizing inflatable types of mandrels formed of rubber or other types of inflatable supporting bags for take-up of the extrusion. A bag 142 is shown in "piggy" form but other shapes such as spherical, beer bottle and the like may be used. The inflating means used and as shown is a gas or fluid at predetermined low or high temperature either to accelerate cooling or quick setting of the take-up extrusion material or to prolong an elevated temperature for slow setting. It is also feasible to use mechanical means for inflating and deflating bag 142.

As shown, bag 142 is introduced on a pipe type of mandrel axis 143 and supported thereon at both ends. The lower end of the bag has an inturned portion 144 for anchorage inside the outer end of axis 143 while the open end or mouth thereof 145 is suitably fastened (frictionally as shown) adjacent the inner end 146 of the axis. Thereafter axis 143 at said inner end is set in an appropriate chuck generally indicated by numeral 147 for rotation to take up the extrusion 148 for formulation 149. When bag 142 is inflated to the shape controlled by the internal structure and configuration thereof, it is held or anchored at mouth 145 and at bottom 144 to axis 143. Although not shown, axis 143 may also move linearly by conventional means as illustrated in connection with apparatus shown in FIGURE 16. Furthermore, although not shown, the internal structure of bag 142 may be provided with end discs connected by collapsible ribs and operating members therefor for effecting various shapes when in extended position.

Bag or sleeve 142 as shown is adapted to be inflated by fluid or air and for this purpose a conventional valve may be provided therefor. However, the inflating and deflating channels shown consists of inlet 150 communicating with the axis 143 and with the bag interior through openings 151. After formulation and setting of the extrusion 148 in the form 149, the bag or sleeve 142 is collapsed as by release of fluid or gas therewithin (by reversing flow in inlet 150) thereby releasing anchorage to axis 143 at inturned portion 144 and mouth 145. Bag 142 and formulation 149 therearound may now be drawn off axis 143 by outward pull either while the axis is in its chuck 147 or when removed therefrom. The collapsed bag or sleeve may then be pulled from formulation 149 by a withdrawal of the bag at the mouth opening 145.

Chuck 147 is of appropriate structure (shown diagrammatically) and may be mounted for horizontal, vertical or angular adjustment for rotation of axis 143 in any position for take up of extrusion 148. Furthermore, the structure of FIGURE 22 is applicable also to extrusions from head 12 whether movable or fixed (FIGURE 1) from extruder 63 (FIGURE 9) and from extruder 74 (FIGURE 16).

In connection with the mounting of mandrel 96 in the apparatus of FIGURE 16, it is to be noted that same is in cantilever form. However, a strong and elongated bearing may be provided on standard 116 as indicated by numeral 116b (FIGURE 16a).

Although specific structure for movements of mandrel 60 in FIGURE 9 have not been shown, conventional means such as the screw 98, gears 114a and 115, and round nut 115a in raceway 115c of FIGURE 16 may be utilized for effecting rotary and linear movement. Other conventional means may be used for mandrel displacement to stretch extrusion 65 of FIGURE 9, said means not being shown.

It is to be observed that the invention herein specifically encompasses in situ economic production from workable plastic extrusions whereby custom-like, artistic and variegated products are formulated directly from the extrusion. The formulations may have uniform cross-sectional dimensions of the extrusion run (FIGURE 22). All the conventional extrudable resins of both the thermoplastic and thermosetting varieties are capable of use except for use of apparatus utilizing subsequent heating after extrusion cooling for softening such as illustrated in FIGURE 16. Here only thermoplastic varieties may be used.

It is to be noted that all minor variations and modifications of hand or automatic procedures for extrusion variation after leaving the extrusion head, variations and modifications of the apparatus and products described and minor variations and modifications in types of resins used including cellulose plastics, phenolic, urea and melamine resins, polyester and styrene resins, vinyl and vinyl copolymer resins, alkyd resins, and others having moldable capacity may all be resorted to without departing from the spirit of the invention and the scope of the appended claims.

I claim:

1. A method of processing in resinous materials comprising extruding a heat-plasticized resin in the form of a continuous tubular filament, simultaneously introducing a flow of shape-maintaining and cooling material during the formation of said filament, and applying by residual heat of formation the said filament directly to a receiving body for design formation.

2. A method of processing in resinous materials comprising extruding a heat plasticized resin in the form of a continuous tubular filament, simultaneously introducing and maintaining a flow of shape-maintaining and cooling material through the filament, applying the resultant hot and shaped-maintained filament directly to a receiving body for a resultant design formation and affixation by residual heat, stretching said hot filament while being applied to said receiving body at selected time intervals for increasing the diameter thereof at the stretched portions to impart a variation in motif of the design formation.

3. A method as set forth in claim 2 wherein external fluid pressure is applied at least on portions of the filament on said body for selectively varying the diameter of the filament and for rapid cooling thereat.

4. A method of processing in resinous materials comprising extruding a heat-plasticized resin in the form of a continuous tubular filament, simultaneously introducing and maintaining a flow of shape-maintaining and cooling material through the filament, applying the resultant hot and shape-maintained filament directly to a receiving body for a resultant design formation and affixation by residual heat, and applying external fluid pressure on sections of the filament on said body for selectively varying the diameter of the filament and rapid cooling thereat to impart a variation in motif of the design formation.

5. A method of processing in resinous materials comprising extruding a heat-plasticized resin in the form of a continuous tubular filament, introducing under controllable pressure a flow of shape-maintaining and cooling material simultaneously through the filament, applying said still soft filament to a movable receiving body for design formation and affixation thereon and for optional removal therefrom, stretching said filament by movement of said body prior to filament application thereon whereby said material causes a variation in diameter of the stretched portion of the filament to vary the design motif of the design formation.

6. A method of processing in resinous materials comprising extruding a heat-plasticized resin in the form of a continuous tubular filament, introducing under optionally variable or uniform pressure a flow of shape-maintaining and cooling material simultaneously through the filament, applying the said still soft filament to a movable receiving body for design formation and affixation thereon and for optional removal therefrom, and applying external flow pressure to selected portions of the filament on the receiving body for any and all purposes of flattening the filament thereat, for rapid cooling the filament thereat and for expanding the filament thereabove by a resultant pressure differential of flow of said shape-maintaining and cooling material.

7. A method of processing resinous materials comprising extruding a heat-plasticized resin in the form of a continuous tubular filament, introducing under optionally variable or uniform pressure a flow of shape-maintaining material simultaneously through the filament, externally cooling said filament, applying said cooled filament and affixing to a movable receiving body for design formation, and varying the diameters and configuration of the continuous filament at preselected portions while on the receiving body.

References Cited in the file of this patent

UNITED STATES PATENTS

| | | |
|---|---|---|
| 361,312 | Muller | Apr. 19, 1887 |
| 990,175 | Walker | Apr. 18, 1911 |
| 1,794,286 | Fulk | Feb. 24, 1931 |
| 2,104,547 | Perseguiti | Jan. 4, 1938 |
| 2,371,074 | Spencer | Mar. 6, 1945 |
| 2,384,521 | Andersen | Sept. 11, 1945 |
| 2,452,607 | Slaughter | Nov. 2, 1948 |
| 2,495,276 | Milton | Jan. 24, 1950 |
| 2,501,833 | Webb et al. | Mar. 28, 1950 |
| 2,516,065 | McElligott | July 18, 1950 |
| 2,528,260 | Cademartori | Oct. 31, 1950 |
| 2,597,638 | Higbie | May 20, 1952 |
| 2,648,098 | McElligott | Aug. 11, 1953 |
| 2,671,939 | Everhart et al. | Mar. 16, 1954 |
| 2,681,685 | Arkless | June 22, 1954 |
| 2,716,777 | Hagen | Sept. 6, 1955 |
| 2,742,000 | Hansen et al. | Apr. 17, 1956 |
| 2,789,381 | Belgard | Apr. 23, 1957 |
| 2,878,514 | Nichols et al. | Mar. 25, 1959 |
| 2,919,467 | Mercer | Jan. 5, 1960 |
| 2,949,658 | Conn | Aug. 23, 1960 |

FOREIGN PATENTS

| | | |
|---|---|---|
| 1,051,991 | France | Jan. 10, 1954 |